United States Patent
Omori et al.

(10) Patent No.: US 8,925,367 B2
(45) Date of Patent: Jan. 6, 2015

(54) METHOD OF CALIBRATING SURFACE TEXTURE MEASUREMENT DEVICE

(75) Inventors: Yoshiyuki Omori, Higashihiroshima (JP); Shousei Miki, Kure (JP)

(73) Assignee: Mitutoyo Corporation, Kanagawa (JP)

( * ) Notice: Subject to any disclaimer, the term of this patent is extended or adjusted under 35 U.S.C. 154(b) by 477 days.

(21) Appl. No.: 13/419,748

(22) Filed: Mar. 14, 2012

(65) Prior Publication Data

US 2012/0234075 A1  Sep. 20, 2012

(30) Foreign Application Priority Data

Mar. 18, 2011  (JP) .................................. 2011-060995
Jan. 20, 2012  (JP) .................................. 2012-010453

(51) Int. Cl.
*G01B 7/34* (2006.01)
*G01B 5/28* (2006.01)
*G01B 5/20* (2006.01)
*G01B 21/04* (2006.01)

(52) U.S. Cl.
CPC ............... *G01B 21/042* (2013.01); *G01B 5/28* (2013.01); *G01B 5/201* (2013.01)
USPC .......................................................... 73/1.81

(58) Field of Classification Search
None
See application file for complete search history.

(56) References Cited

U.S. PATENT DOCUMENTS

| | | | |
|---|---|---|---|
| 6,327,788 B1 | 12/2001 | Seddon et al. | |
| 7,036,238 B2 | 5/2006 | Kojima et al. | |
| 2004/0200085 A1 | 10/2004 | Sakata et al. | |
| 2005/0132591 A1 | 6/2005 | Kojima et al. | |
| 2011/0000277 A1* | 1/2011 | MacManus | 73/1.79 |

FOREIGN PATENT DOCUMENTS

| | | |
|---|---|---|
| EP | 1467175 | 10/2004 |
| EP | 1548395 | 6/2005 |
| JP | 58-083201 | 5/1983 |
| JP | 9-329402 | 12/1997 |
| WO | 97/21076 | 6/1997 |

OTHER PUBLICATIONS

EPO search report, mail date Aug. 1, 2012.

* cited by examiner

*Primary Examiner* — Robert R Raevis

(57) ABSTRACT

A method of calibrating a surface texture measurement device includes obtaining Y-axis shape measurement data and a maximum diameter portion to obtain upper and lower maximum diameter portions of a reference sphere from Y-axis upper and lower shape data obtained by relatively moving in the Y-axis direction while a downward and an upward styluses are in contact with an upper and a lower surfaces, respectively, of the reference sphere; obtaining X-axis shape measurement data to obtain X-axis upper and lower shape data of the reference sphere by relatively moving in the X-axis direction while the downward stylus is in contact with the upper diameter portion and the upward stylus with the lower diameter portion of the reference sphere; and calculating offset amounts Δx and Δz of the upward and downward styluses from center coordinates O3 and O4 obtained from the shape data.

5 Claims, 12 Drawing Sheets

METHOD OF CALIBRATING SURFACE TEXTURE MEASUREMENT DEVICE

CROSS-REFERENCE TO RELATED APPLICATIONS

The present application claims priority under 35 U.S.C. §119 of Japanese Application Nos. 2011-060995 and 2012-010453 filed on Mar. 18, 2011, and Jan. 20, 2012, respectively, the disclosures of which are expressly incorporated by reference herein in their entireties.

BACKGROUND OF THE INVENTION

1. Field of the Invention

The present invention relates to a method of calibrating a surface texture measurement device. Specifically, the present invention relates to a method of calibrating a surface texture measurement device that measures the shape, roughness, and the like of a measured object by tracing the surface thereof with a stylus.

2. Description of Related Art

A surface texture measurement device is known that moves a stylus along a surface of a measured object in a state where the stylus is in contact with the surface of the measured object, detects a displacement of the stylus caused by the surface shape and surface roughness of the measured object, and measures the surface texture, such as the shape and roughness, of the measured object from the displacement of the stylus.

Such a surface texture measurement device normally has a detector including a measurement arm swingably supported at a rotation axis as a support point, a stylus provided in an end of the measurement arm, and a detection unit that detects a swing amount of the measurement arm; a stage holding a measured object; and a relative movement mechanism relatively moving the detector and the stage. For measurement, in a state where the stylus is in contact with the surface of the measured object, the relative movement mechanism relatively moves the detector and the stage and then the detector detects a swing amount of the measurement arm. The device measures the surface texture of the measured object based on the swing amount.

To measure the upper and lower surfaces of the internal diameter of a cylindrical workpiece using such a surface texture measurement device, for example, it is conventionally required to attach an arm having a downward stylus at the end to a detector main body, measure the lower surface of the internal diameter of the cylindrical workpiece, remove the arm, change the direction of the stylus to upward, attach the arm to the detector main body, and measure the upper surface of the internal diameter of the cylindrical workpiece. Measurement thus takes time due to removal and attachment of the aim.

A structure is proposed that allows measurement of the upper and lower surfaces of the internal diameter of a cylindrical workpiece without requiring removal and attachment of a measurement arm (Japanese Patent Laid-open Publication No. S58-83201). In the structure, an upward stylus and a downward stylus are provided to an end of the measurement arm. The end of the measurement arm is urged upward to allow the upward stylus to measure the upper surface of the internal diameter of the cylindrical workpiece. Then, the end of the measurement arm is switched to be urged downward to allow the downward stylus to measure the lower surface of the internal diameter of the cylindrical workpiece.

With the surface texture measurement device above having the upward stylus and the downward stylus, however, the mutual relationship cannot be accurately evaluated between the measurement results provided by the upward stylus and the measurement results provided by the downward stylus unless the mutual positional relationship of the upward stylus and the downward stylus is accurately known. To measure the thickness of a measured object, for instance, the shape of the lower surface of the measured object is measured with the upward stylus; the shape of the upper surface of the measured object is measured with the downward stylus; and the thickness of the measured object is then obtained from the measurement results of the lower surface and the measurement results of the upper surface. Unless the mutual positional relationship of the upward stylus and the downward stylus is accurately known, the thickness of the measured object cannot be accurately evaluated.

SUMMARY OF THE INVENTION

An advantage of the present invention is to provide a method of calibrating a surface texture measurement device having an upward stylus and a downward stylus, the method providing an accurate mutual positional relationship of the upward stylus and the downward stylus.

An aspect of the present invention provides a method of calibrating a surface texture measurement device including a detector including a measurement arm supported swingably in a vertical direction at a rotation axis as a support point, an upward stylus and a downward stylus each provided in an end portion of the measurement arm and projecting in a swing direction of the measurement arm, and a detection unit that detects a swing amount of the measurement arm; a stage holding a measured object; and a relative movement mechanism relatively moving the detector and the stage. The method includes obtaining first axis shape measurement data by relatively moving the detector and the stage in a first axis direction while the downward stylus is in contact with an upper surface of a reference sphere to obtain first axis upper shape measurement data and by relatively moving the detector and the stage in the first axis direction while the upward stylus is in contact with a lower surface of the reference sphere to obtain first axis lower shape measurement data; and calculating offset amounts of the upward stylus and the downward stylus based on a first center coordinate obtained from the first axis upper shape measurement data and a second center coordinate obtained from the first axis lower shape measurement data.

According to the configuration above, in the obtaining of the first axis shape measurement data, the first axis upper shape measurement data is obtained by relatively moving the detector and the stage in the first axis direction while the downward stylus is in contact with the upper surface of the reference sphere. The first axis lower shape measurement data is obtained by relatively moving the detector and the stage in the first axis direction while the upward stylus is in contact with the lower surface of the reference sphere. Then, in the calculating of the offset amounts, the offset amounts of the upward stylus and the downward stylus are calculated based on the first center coordinate obtained from the first axis upper shape measurement data and the second center coordinate obtained from the first axis lower shape measurement data. Thereby, the mutual positional relationship between the upward stylus and the downward stylus can be accurately provided in the first axis direction, thus allowing accurate evaluation of a mutual relationship of measurement results with the upward stylus and measurement results with the downward stylus.

In the method of calibrating the surface texture measurement device according to the present invention, the obtaining of the first axis shape measurement data may include obtaining a maximum diameter by moving in a second axis direction orthogonal to the first axis direction to obtain a plurality of first axis upper shape measurement data and a plurality of first axis lower shape measurement data and thus to obtain an upper maximum diameter portion of the reference sphere from the plurality of obtained first axis upper shape measurement data as well as to obtain a lower maximum diameter portion of the reference sphere from the plurality of obtained first axis lower shape measurement data.

The method of calibrating the surface texture measurement device according to the present invention may further include obtaining second axis shape measurement data by relatively moving the detector and the stage in the second axis direction orthogonal to the first axis direction while the downward stylus is in contact with the upper maximum diameter portion of the reference sphere to obtain second axis upper shape measurement data of the reference sphere and by relatively moving the detector and the stage in the second axis direction while the upward stylus is in contact with the lower maximum diameter portion of the reference sphere to obtain second axis lower shape measurement data. The calculating of the offset amounts may calculate the offset amounts of the upward stylus and the downward stylus based on the first center coordinate and the second center coordinate, as well as a third center coordinate obtained from the second axis upper shape measurement data and a fourth center coordinate obtained from the second axis lower shape measurement data.

It is preferred that the method of calibrating the surface texture measurement device of the present invention include setting correction parameters to obtain optimum correction parameters for correction of a measurement error included in the second axis upper shape measurement data and the second axis lower shape measurement data. The setting of correction parameters simultaneously obtains correction parameters for each of a plurality of areas of a measurement range divided along the swing direction of the measurement arm. In such a configuration, the correction parameters are simultaneously estimated for each of the plurality of the areas divided along the swing direction of the measurement arm. The measurement data measured by the styluses (measurement arm) that perform a swing motion can thus be corrected with higher precision.

It is preferred in the method of calibrating the surface texture measurement device of the present invention that the correction parameters include an arm length of the measurement arm, an edge length of each of the downward stylus and the upward stylus, and a gain coefficient. According to the configuration, the arm length of the measurement arm, the edge length of each of the downward stylus and the upward stylus, and the gain coefficient are also obtained as the correction parameters, thus ensuring high-precision measurement.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

First Embodiment (Explanation of Surface Texture Measurement Device)

Figure 1:
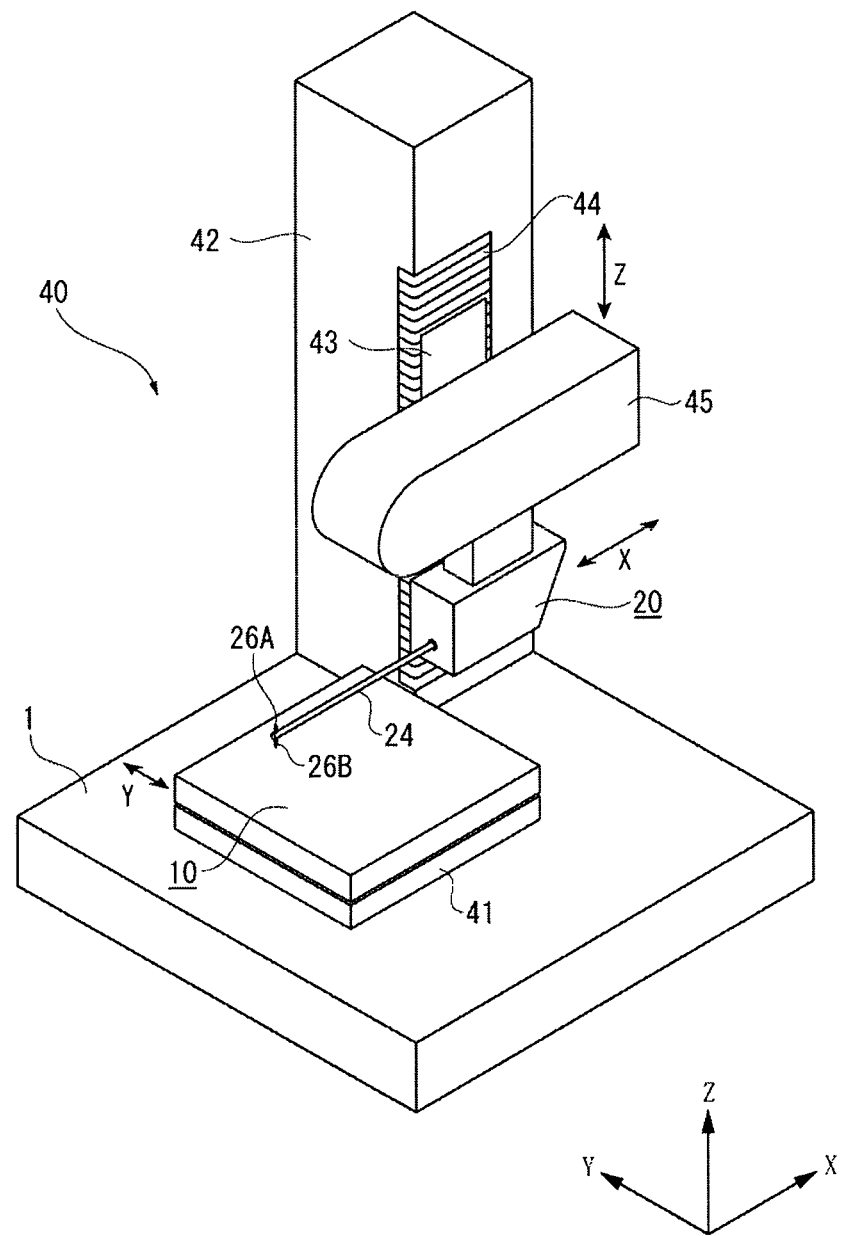
FIG. 1 is a perspective view illustrating a surface texture measurement device according to a first embodiment of the present invention.

With reference to FIG. 1, a surface texture measurement device according to the present embodiment has a base 1; a stage 10 placed on the base 1 such that a measured object is placed on an upper surface thereof; a stylus displacement detector 20 having styluses 26A and 26B that come into contact with a surface of the measured object; and a relative movement mechanism (also referred to as a relative movement driver) 40 relatively moving the stylus displacement detector 20 and the stage 10.

The relative movement mechanism 40 has a Y-axis drive mechanism 41 provided between the base 1 and the stage 10 and moving the stage 10 to one direction of a horizontal direction (Y-axis direction); a column 42 standing on the upper surface of the base 1; a Z slider 43 provided to the column 42 movably in a vertical direction (Z-axis direction); a Z-axis drive mechanism 44 moving up and down the Z slider 43; and an X-axis drive mechanism 45 provided to the Z slider 43 and moving the stylus displacement detector 20 in an orthogonal direction (X-axis direction) to the moving direction of the stage 10 (Y-axis direction) and to the direction of moving up and down the Z slider 43 (Z-axis direction). Thus, the relative movement mechanism 40 is composed of a three-dimensional movement mechanism including the Y-axis drive mechanism 41 that moves the stage 10 in the Y-axis direction, the Z-axis drive mechanism 44 that moves the stylus displacement detector 20 in the Z-axis direction, and the X-axis drive mechanism 45 that moves the stylus displacement detector 20 in the X-axis direction.

Figure 2:
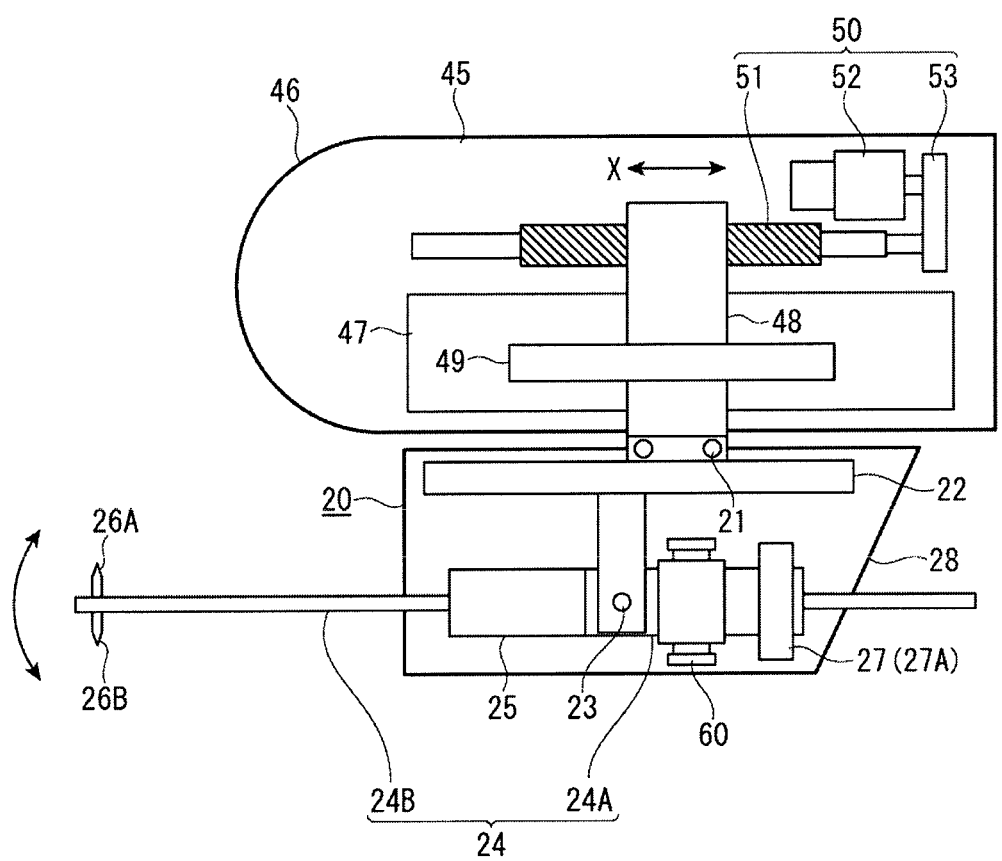
FIG. 2 illustrates an X-axis drive mechanism and a stylus displacement detector according to the first embodiment.

The Y-axis drive mechanism 41 and the Z-axis drive mechanism 44 are composed of a feed screw mechanism (not shown in the drawing), for example, including a ball threaded shaft and a nut member screwed into the ball threaded shaft. With reference to FIG. 2, the X-axis drive mechanism 45 has a drive mechanism main body 46 fixed to the Z slider 43; a guide rail 47 provided to the drive mechanism main body 46 in parallel to the X-axis direction; an X slider 48 provided along the guide rail 47 movably in the X-axis direction; an X-axis position detector 49 detecting a position of the X slider 48 in the X-axis direction; and a feed mechanism 50 moving the X slider 48 along the guide rail 47. The feed mechanism 50 has a feed threaded shaft 51 provided to the drive mechanism main body 46 in parallel to the guide rail 47 and screwed into the X slider 48; a motor 52 as a driving source; and a rotation transmission mechanism 53 transmitting rotation of the motor 52 to the feed threaded shaft 51. The rotation transmission mechanism 53 is composed of mechanisms, such as, for example, a gear train, a belt, and a pulley.

With reference to FIG. 2, the stylus displacement detector 20 has a bracket 22 attachably and detachably suspended and supported by the X slider 48 through a bolt 21; a measurement arm 24 supported swingably in the vertical direction (Z-axis direction) by the bracket 22 at a rotation axis 23 as a support point; a pair of styluses 26A and 26B provided in an end portion of the measurement arm 24; a Z-axis position detector 27 detecting a swing amount (displacement amount) in the Z-axis direction of the measurement arm 24; a measurement arm position switching mechanism 60 switching the measurement arm 24 between a position urged to one side of a swing direction (e.g., upward direction) and a position urged to the other side of the swing direction (downward direction); and a casing 28 covering the bracket 22, the measurement arm 24, the Z-axis position detector 27, and the measurement arm position switching mechanism 60.

The measurement arm 24 includes a first measurement arm 24A and a second measurement arm 24B, the first measurement arm 24A being supported swingably in the vertical direction by the bracket 22 at the rotation axis 23 as a support point, the second measurement arm 24B being replaceably attached to an end of the first measurement arm 24A through an attachment/detachment mechanism 25. The styluses 26A and 26B are provided to the second measurement arm 24B and project in the swing direction. Specifically, the upward stylus 26A and the downward stylus 26B project in the upward and downward directions, respectively, orthogonal to the second measurement arm 24B. The Z-axis position detector 27 is provided according to a swing range of the measurement arm 24 and is composed of a detector outputting pulse signals in a number corresponding to the swing amount of the measurement arm 24. The Z-axis position detector 27 includes a scale 27A and a detection head (not shown in the drawing), for example, the scale 27A being provided to the casing 28 according to the swing range of the measurement arm 24, the detection head being attached to the measurement arm 24 opposite to the scale 27A.

(Explanation on Method of Calculating Offset Amount)

Figure 3:
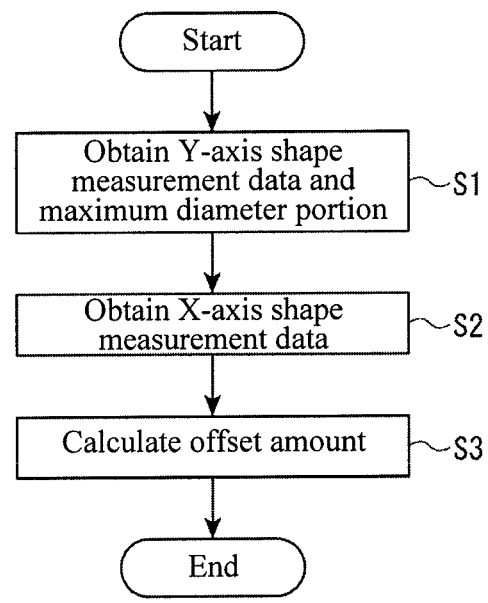
FIG. 3 is a flowchart illustrating a procedure for a method of calibration according to the first embodiment.

To obtain a mutual positional relationship (offset amount) of the upward stylus 26A and the downward stylus 26B, a process to obtain Y-axis shape measurement data as a first axis and a maximum diameter portion (S1), a process to obtain X-axis shape measurement data as a second axis (S2), and a process to calculate offset amount (S3) are performed in sequence as shown in FIG. 3.

Figure 4:
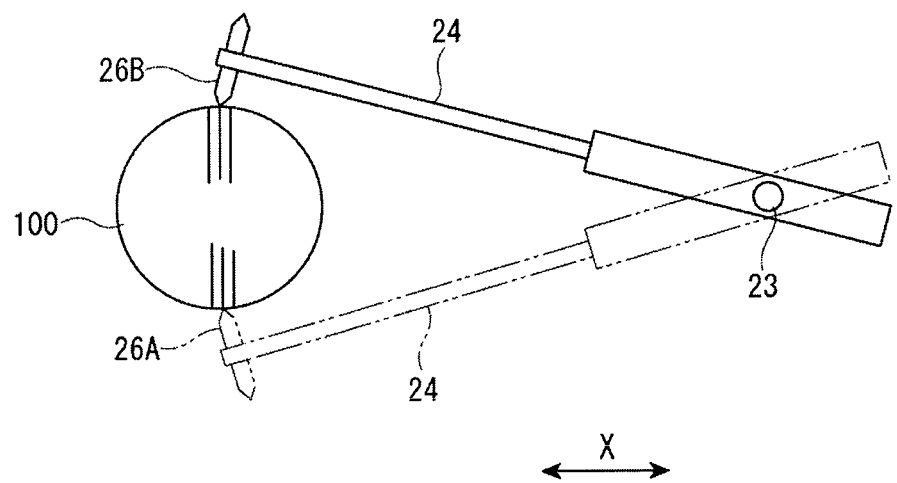
FIG. 4 illustrates a process of obtaining first axis shape measurement data and a maximum diameter portion in the method of calibration according to the first embodiment.

In the process to obtain the Y-axis shape measurement data and the maximum diameter portion (S1), a reference sphere 100 is set on the stage 10, and then the downward stylus 26B is brought into contact with an upper surface of the reference sphere 100, as shown in FIG. 4. In this state, the stylus displacement detector 20 and the stage 10 are relatively moved in the Y-axis direction. The stage 10 is moved in the Y-axis direction herein. The measurement above is repeated while the stylus displacement detector 20 is moved in the X-axis direction at a predetermined pitch. A plurality of Y-axis upper shape measurement data of the reference sphere 100 is then obtained. The highest position among the Y-axis upper shape measurement data is provided as the upper maximum diameter portion of the reference sphere 100. Then, the upward stylus 26A is brought into contact with a lower surface of the reference sphere 100. In this state, the stage 10 is relatively moved in the Y-axis direction. The measurement above is repeated while the stylus displacement detector 20 is moved in the X-axis direction at a predetermined pitch. A plurality of Y-axis lower shape measurement data of the reference sphere 100 is then obtained. The lowest position among the Y-axis lower shape measurement data is provided as the lower maximum diameter portion of the reference sphere 100.

Figure 5:
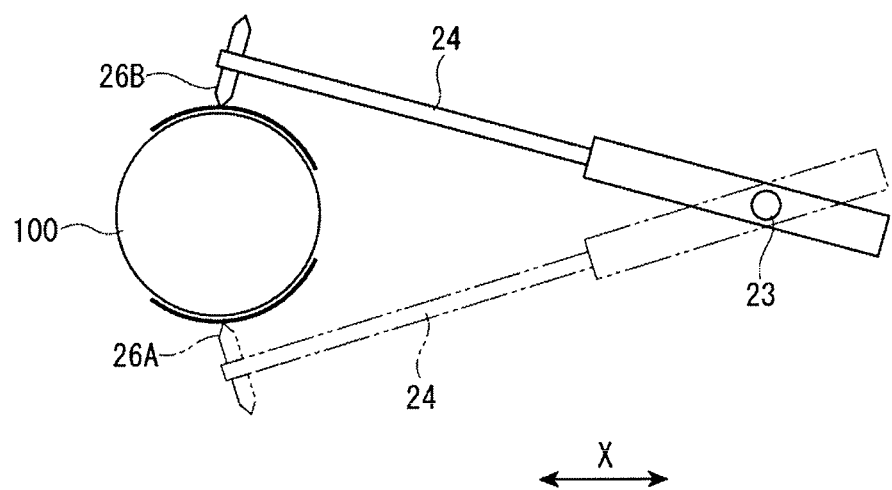
FIG. 5 illustrates a process of obtaining second axis shape measurement data in the method of calibration according to the first embodiment.

In the process to obtain the X-axis shape measurement data (S2), the downward stylus 26B is brought into contact with the upper maximum diameter portion of the reference sphere 100, as shown in FIG. 5. In this state, the stylus displacement detector 20 and the stage 10 are relatively moved in the X-axis direction orthogonal to the Y-axis direction. The stylus displacement detector 20 is moved in the X-axis direction herein. X-axis upper shape measurement data of the reference sphere 100 is thus obtained. Then, the upward stylus 26A is brought into contact with the lower maximum diameter portion of the reference sphere 100. In this state, the stylus displacement detector 20 is relatively moved in the X-axis direction. X-axis lower shape measurement data of the reference sphere 100 is thus obtained.

Figure 6:
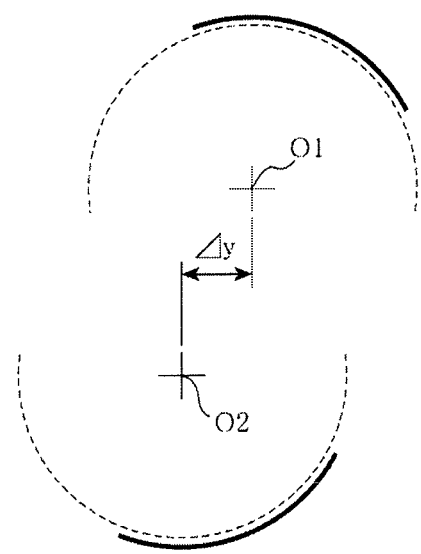
FIG. 6 illustrates a process of calculating an offset amount ($\Delta y$) according to the first embodiment.
Figure 7:
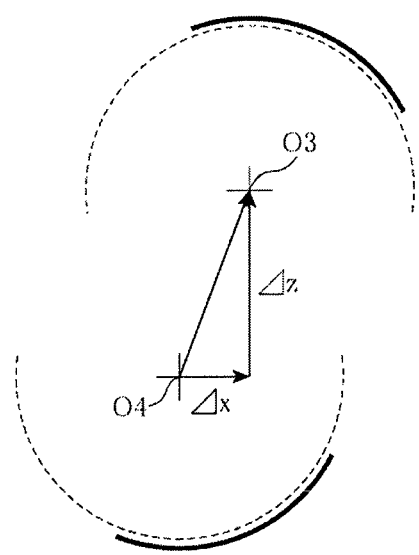
FIG. 7 illustrates a process of calculating offset amounts ($\Delta x$, $\Delta z$) according to the first embodiment.

In the process to calculate offset amounts (S3), the offset amounts of the upward stylus 26A and the downward stylus 26B are calculated based on a first center coordinate obtained from the Y-axis upper shape measurement data, a second center coordinate obtained from the Y-axis lower shape measurement data, a third center coordinate obtained from the X-axis upper shape measurement data, and a fourth center coordinate obtained from the X-axis lower shape measurement data. With reference to FIG. 6, for example, the offset amount in the Y-axis direction $\Delta y$ of the upward stylus 26A and the downward stylus 26B is calculated from a difference between the first center coordinate O1 obtained from the Y-axis upper shape measurement data and the second center coordinate O2 obtained from the Y-axis lower shape measurement data. With reference to FIG. 7, the offset amount in the Z-axis direction $\Delta z$ orthogonal to the Y axis and X axis and the offset amount in the X-axis direction $\Delta x$ are calculated from a difference between the third center coordinate O3 obtained from the X-axis upper shape measurement data and the fourth center coordinate O4 obtained from the X-axis lower shape measurement data.

Thereby, the mutual positional relationship between the upward stylus 26A and the downward stylus 26B is accurately provided. Thus, correcting the results measured by the upward stylus 26A and the results measured by the downward stylus 26B with the offset amounts allows accurate evaluation of the mutual relationship between the results measured by the upward stylus 26A and the results measured by the downward stylus 26B. In a case of measuring the thickness of a measured object, for example, the lower surface shape of the measured object is measured by the upward stylus 26A, and then the upper surface shape of the measured object is measured by the downward stylus 26B. The lower surface measurement results and the upper surface measurement results are corrected with the offset amounts. The thickness of the measured object is then obtained from the corrected results, thus allowing accurate evaluation of the thickness of the measured object. Similarly, in a case of measuring upper and lower surfaces of an internal diameter of a cylindrical measured object, the upper surface of the internal diameter of the cylindrical measured object is measured by the upward stylus 26A, and then the lower surface of the internal diameter of the cylindrical measured object is measured by the downward stylus 26B. The measurement results are corrected with the offset amounts, thus providing accurate evaluation of the upper surface and the lower surface of the internal surface of the cylinder based on the measurement results.

In a case where it is deemed that the upward stylus 26A and the downward stylus 26B are not misaligned (i.e., are in the same position) in either the X-axis direction or the Y-axis direction, the upper and lower shape measurement data may be obtained only in the other direction. In the embodiment above, for instance, in the case where it is deemed that there is no misalignment in the Y-axis direction, the process to obtain the Y-axis shape data and the maximum diameter portion (S1) is eliminated and the process to obtain the X-axis shape data (S2) is performed with the X axis as the first axis. In the process, the X-axis upper shape data and the X-axis lower shape data may be obtained by contacting the styluses to the upper surface and the lower surface. The styluses do not have to be brought into contact with the upper maximum diameter portion and the lower maximum diameter portion. In the process to calculate offset amounts (S3), the offset amounts of the upward stylus 26A and the downward stylus 26B are calculated based on the center coordinate obtained from the X-axis upper shape measurement data as the first center coordinate and the center coordinate obtained from the X-axis lower shape measurement data as the second center coordinate.

Alternatively, the process to obtain the Y-axis shape data and the maximum diameter portion (S1) may be performed to obtain the upper maximum diameter portion and the lower maximum diameter portion. In the process to obtain the X-axis shape data (S2), the styluses may be brought into contact with the upper maximum diameter portion and the lower maximum diameter portion. In this case, the Y axis is the first axis and the X axis is the second axis.

In the embodiment above, in a case where it is deemed that there is no misalignment in the X-axis direction, the process to obtain the Y-axis shape data and the maximum diameter portion (S1) is performed with the Y axis as the first axis and the process to obtain the X-axis shape data (S2) may be eliminated. In the process to calculate offset amounts (S3), the offset amounts of the upward stylus 26A and the downward stylus 26B are calculated based on the center coordinate obtained from the Y-axis upper shape measurement data as the first center coordinate and the center coordinate obtained from the Y-axis lower shape measurement data as the second center coordinate. It is not necessary to obtain the maximum diameter portion in the process to obtain the Y-axis shape data and the maximum diameter portion (S1).

Figure 12:
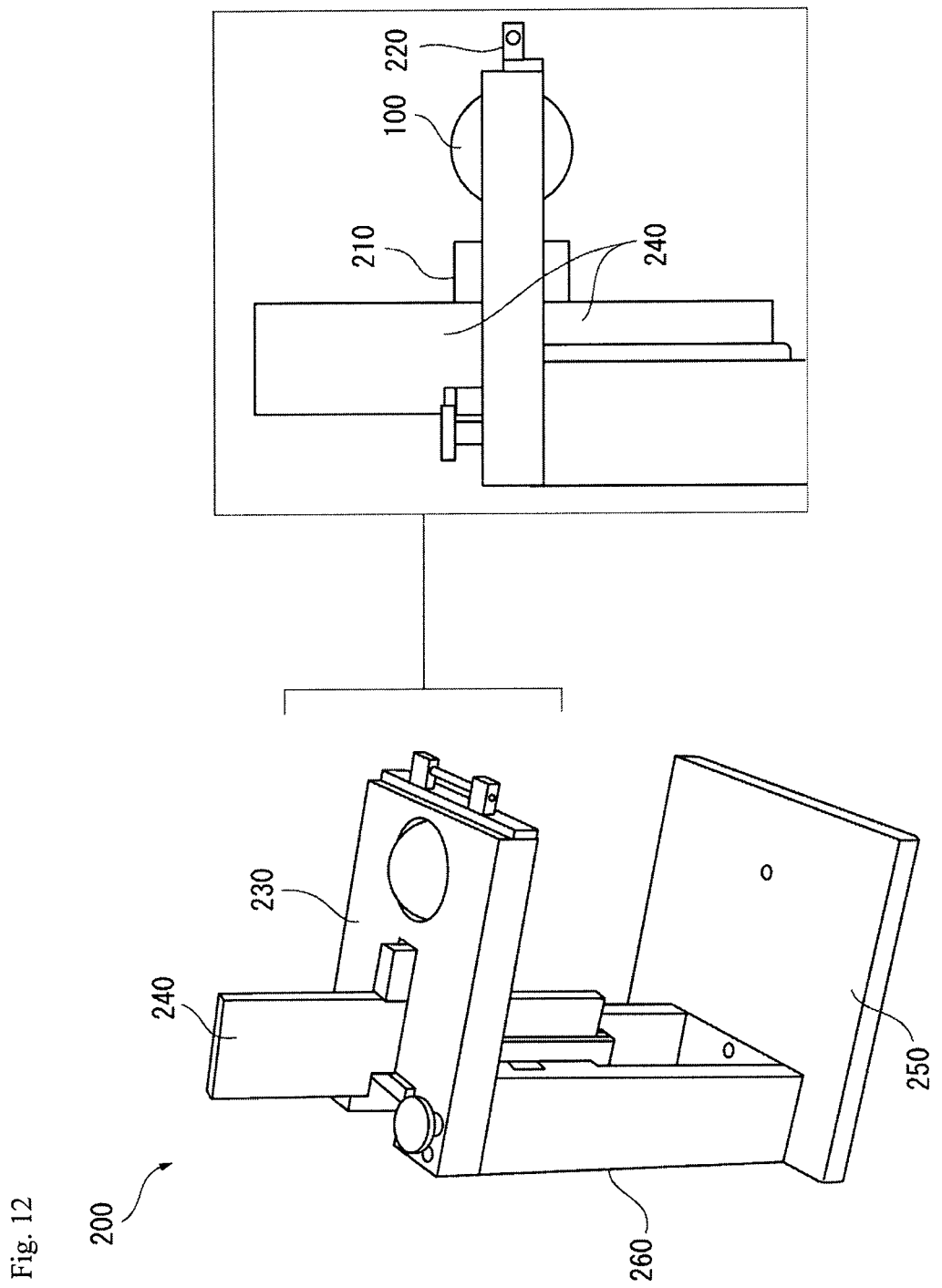
FIG. 12 illustrates an example of a calibration tool.

With respect to the reference sphere 100, a calibration tool 200 including the reference sphere 100 as shown in FIG. 12 may be used. The calibration tool 200 has a step 210, the reference sphere 100, and a pin gauge 220, which are disposed adjacently and supported by a support plate 230 with upper and lower surfaces thereof exposed. The calibration tool 200 maintains the support plate 230 to be horizontal by fitting a gauge block 240 to a side surface of the step 210 and by fixing the support plate 230 to a column 260 standing from an upper surface of a base 250.

The X-axis upper shape data is obtained by contacting the downward stylus 26B with the upper surface of the step 210; relatively moving the stylus displacement detector 20 and the stage 10 in the X-axis direction in the state of contact; and scanning the upper surfaces of the step 210, the reference sphere 100, and the pin gauge 220 in sequence with the downward stylus 26B. Then, the X-axis lower shape data is obtained by contacting the upward stylus 26A with the lower surface of the step 210; relatively moving the stylus displacement detector 20 and the stage 10 in the X-axis direction in the state of contact; and scanning the lower surfaces of the step 210, the reference sphere 100, and the pin gauge 220 in sequence with the upward stylus 26A. Using the X-axis upper shape data and X-axis lower shape data obtained as above allows calibrations of not only offset amounts but also of Z gain, symmetricity (identical measurement values in measurement of an upward inclined surface and a downward inclined surface of the same measured object), and stylus radius simultaneously.

Second Embodiment

Figure 8:
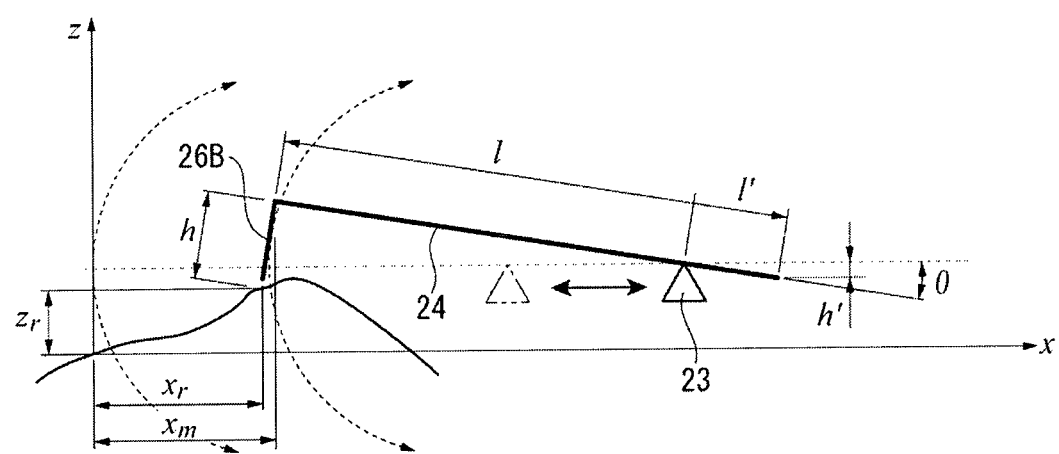
FIG. 8 illustrates a measurement error of an arc motion of a measurement arm of the surface texture measurement device.

In the structure of the surface texture measurement device explained in the first embodiment, the measurement arm 24 performs a swing motion (arc motion) in the vertical direction at the rotation axis 23 as a support point, thus causing a measurement error. As shown in FIG. 8, for instance, the measurement data ($x_m$, $z_m$) provided by the downward stylus 26B is different from a correct measurement position ($x_r$, $z_r$) due to an effect of the arc motion of the measurement arm 24. For high-precision measurement, the measurement data ($x_m$, $z_m$) should be appropriately corrected. In the second embodiment, a correction mechanism is provided to correct a measurement error caused by the arc motion of the measurement arm 24. Although the correction mechanism is explained in detail in Japanese Patent Laid-open Publication No. 2007-316046 filed by the Applicant of the present invention, an overview of the same is briefly described here. In the explanation below, a mechanism that includes the X-axis drive mechanism 45 and the stylus displacement detector 20 is referred to as a pick-up mechanism.

(Explanation of Correction Mechanism)

Figure 9:
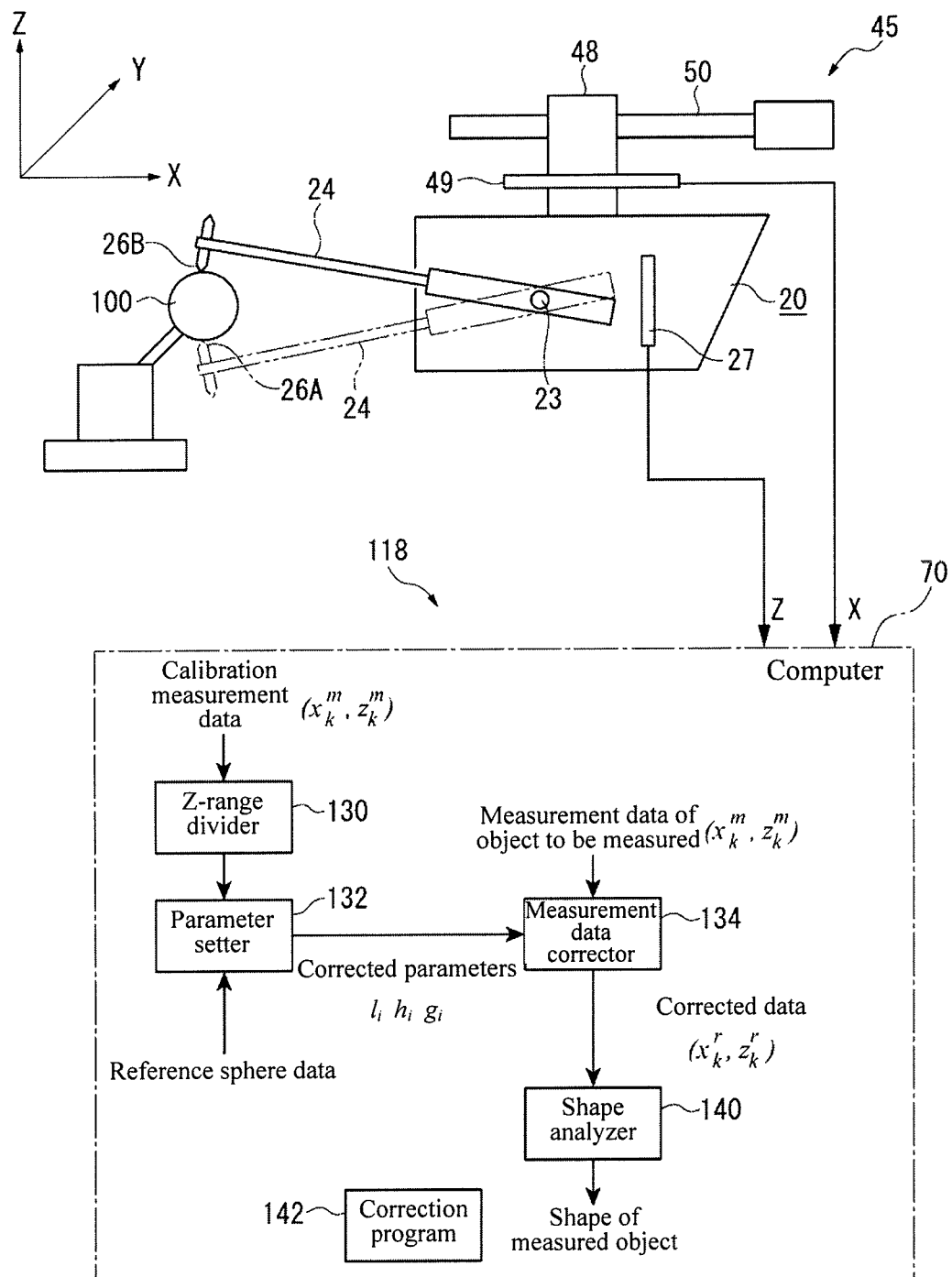
FIG. 9 illustrates a correction mechanism according to a second embodiment of the present invention.

With reference to FIG. 9, a correction mechanism 118 has a Z-range divider (measurement range divider) 130 performing a Z-range division process (measurement range division process); a correction parameter setter 132 performing a correction parameter setting process; a measurement data corrector 134 performing a measurement data correction process; a shape analyzer 140 analyzing the shape of a measured object from corrected data obtained in the measurement data corrector 134; and a correction program 142 allowing a computer 70 to execute the processes above.

Figure 10:
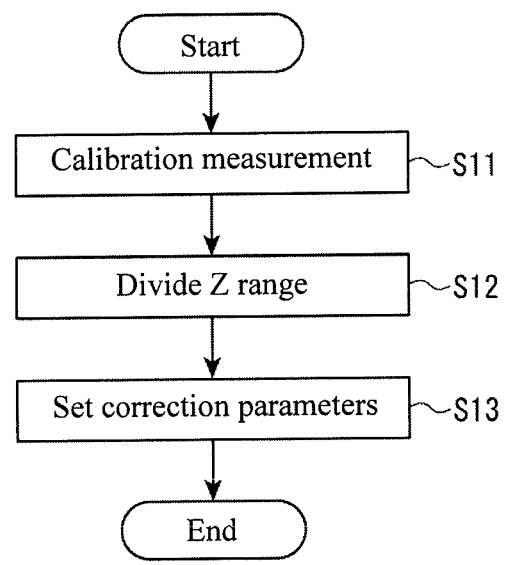
FIG. 10 is a flowchart illustrating a procedure for calibration according to the second embodiment.

For high-precision correction of a measurement error caused by the arc motion of the measurement arm 24 having a stylus, a Z-axis measurement range of the stylus is divided into a plurality of areas, for each of which optimum correction parameters are set in the present embodiment. Thus, the correction program 142 allows the computer 70 to execute a calibration measurement process (S11), a Z-range division process (S12), and a correction parameter setting process (S13) as shown in FIG. 10 in the present embodiment.

The calibration measurement process (S11) obtains the X-axis upper shape measurement data and the X-axis lower shape measurement data obtained in the process to obtain the X-axis shape measurement data described in the first embodiment. Specifically, a displacement in the X-axis direction and a displacement in the Z-axis direction of the stylus are obtained from the displacement in the X-axis direction provided by the X-axis position detector 49 and the displacement in the Z-axis direction provided by the Z-axis position detector 27. An XZ coordinate value of the stylus is calculated from the obtained displacement in the X-axis direction and displacement in the Z-axis direction, and then calibration measurement data is obtained from the XZ coordinate value.

Figure 11:
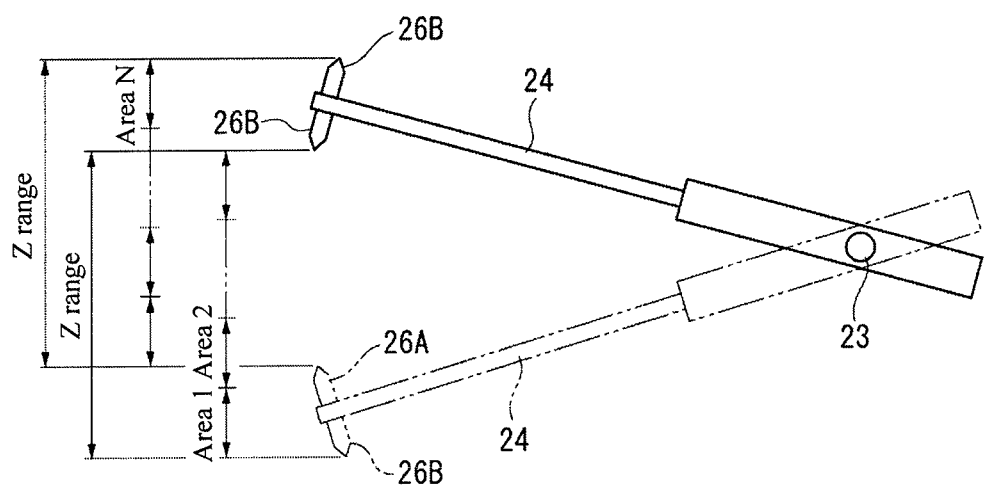
FIG. 11 illustrates a process of Z-range division according to the second embodiment.

The Z-range division process (S12) divides into a plurality of areas a Z range (measurement range in the height direction) measurable by the stylus. Specifically, the process employs a multilayer structure model as illustrated in FIG. 11. The Z range measurable by the stylus is divided into a plurality of areas (area 1, area 2, ... area N). Optimum correction parameters are set for each of the areas (area 1, area 2, ... area N). In a case where an arc motion model of a pick-up mechanism is applied, the correction parameters include an arm length l of the measurement arm 24, an edge length h of each of the styluses 26A and 26B, and a gain coefficient g. A set of the correction parameters is set for each area. In the present embodiment, including the Z-range division process (S12) and the like allows appropriate modeling of even a state where an actual arc motion of the stylus deviates from the ideal arc motion. Thus, a measurement error due to misalignment from the Z axis can be obtained more accurately for the actual arc motion of the stylus, thus allowing more appropriate correction of the measurement error.

The correction parameter setting process (S13) compares within the XZ plane the calibration measurement data obtained in the calibration measurement process (S11) and a circle as reference shape data for the reference sphere 100. Correction parameter values for each of the areas divided in the Z-range division process (S12) and correction parameter values common to the areas are concurrently estimated and set to optimally correct the measurement error caused by the arc motion of the stylus. In the present embodiment, the calibration measurement data and the reference shape data of the reference sphere are compared and all correction parameter values necessary for correction of the measurement error due to the arc motion of the stylus are concurrently calculated in a nonlinear least-squares method. Thus, a one-time calibration measurement of the reference sphere 100 allows concurrent calculation of all correction parameter values necessary for correction, thus enhancing efficiency in correction.

In the correction parameter setting process (S13), after the optimum correction parameters are set for each area, the measured object is measured. The measurement data corrector 134 then identifies an area i to which the measurement data belong based on the Z coordinate data of the measurement data. The measurement data corrector 134 selects the optimum correction parameter values for the identified area i from the correction parameters obtained in the correction parameter setting process, and corrects the measurement data with the selected correction parameters. The shape analyzer 140 obtains the shape of the measured object from the corrected data corrected by the measurement data corrector 134.

Thereby, the measurement result in which the measurement error is corrected is obtained, the measurement error being associated with the vertical arc motion of the measurement arm 24 at the rotation axis 23 as a support point. In the present embodiment, in particular, the measured data is corrected using the correction parameters optimum for each of the areas in the Z range. Thus, errors can be corrected with a higher degree of precision compared with a conventional method that applies the same correction parameters to all areas of the Z range. This is achieved by a multilayer structure algorithm, where the Z-axis measurement range is divided into a plurality of areas, for each of which optimum correction parameter values are set.

A model is explained below to which the multilayer structure algorithm according to the present embodiment is applied. In a model illustrated in FIG. 8, the measurement data $(x_m, z_m)$ obtained from the stylus is different from the correct measurement position $(x_r, z_r)$ due to the effect of the arc motion of the measurement arm 24. For high precision measurement, the measurement data $(x_m, z_m)$ should be appropriately corrected. The Z coordinate value $z_m$ of the measurement data obtained by the stylus is provided by the Expression 1 below, where a Z-axis gain coefficient is g.

$$z_m = \frac{lh'}{gl'} = \frac{l\sin\theta}{g} \quad [\text{Expression 1}]$$

The true Z coordinate value is provided by the Expression 2 below.

$$z_r = h - (h\cos\theta - l\sin\theta) = h(1-\cos\theta) + l\sin\theta \quad [\text{Expression 2}]$$

The true X coordinate value $x_r$ and the X coordinate value $x_m$ of the measurement data have a relationship represented by the Expression 3 below.

$$x_r - x_m = l - l\cos\theta - h\sin\theta = l(1-\cos\theta) - h\sin\theta \quad [\text{Expression 3}]$$

Thus, the correct measurement position $(x_r, z_r)$ is represented by the Expression 4 below.

$$x_r = x_m + l\left(1 - \sqrt{1 - \left(\frac{gz_m}{l}\right)^2}\right) - h\frac{gz_m}{l} \quad [\text{Expression 4}]$$

$$z_r = gz_m + h\left(1 - \sqrt{1 - \left(\frac{gz_m}{l}\right)^2}\right)$$

An example is explained below in which the multilayer structure algorithm according to the present invention is applied to the model above. The basic concept of the multilayer structure algorithm is to employ the multilayer structure model as illustrated in FIG. 11 in the model illustrated in FIG. 8. Specifically, in the present invention, the Z range measurable by the stylus is divided into a plurality of areas (area 1, area 2, ... area N), for each of which optimum correction parameter values are set. In the case of applying the arc motion model of the pick-up mechanism represented by the Expression 4, for example, the correction parameters are the arm length l of the measurement arm 24, the edge length h of each of the styluses 26A and 26B, and the gain coefficient g. The correction parameters are set for each area.

An example is explained below in which the multilayer structure algorithm according to the present invention illustrated in FIG. 11 is applied to the model illustrated in FIG. 8 to estimate correction parameters. The calibration measurement using the reference sphere 100 is performed to estimate the correction parameters. Specifically, the process to obtain the X-axis shape measurement data explained in the first embodiment is performed. It is assumed that the reference sphere 100 is a known workpiece of a nearly true sphere having a precisely finished surface and a radius R, that the end shape of each of the styluses 26A and 26B is round, and that the Z range is divided into a plurality of N areas (area 1, area 2, . . . area N). The areas, however, need not be equally divided. The measurement data obtained by measuring the reference sphere 100 using the styluses 26A and 26B is ($x_k^m$, $z_k^m$), where k=1, 2, . . . n. The correction parameters are then assumed such that a square sum of a difference from the reference sphere 100 is minimized. An evaluation amount $\varphi$ is represented by the Expression 5 below, where the radius of the reference sphere 100 is R, the center coordinate of the reference sphere 100 is ($x_c$, $z_c$), and the end radius of each of the styluses 26A and 26B is r.

$$\varphi = \sum_{k=1}^{n} \left\{ \sqrt{(x_k^r - x_c)^2 + (z_k^r - z_c)^2} - (R+r) \right\}^2 \quad \text{[Expression 5]}$$

The correction value ($x_k^r$, $z_k^r$) is a correction value of the measurement data ($x_k^m$, $z_k^m$) and is represented by the Expression 6 below using correction parameters $l_i$, $h_i$, and $g_i$.

$$x_k^r = x_k^m + l_i\left(1 - \sqrt{1 - \left(\frac{g_i z_k^m}{l_i}\right)^2}\right) - h_i \frac{g_i z_k^m}{l_i}$$

$$z_k^r = g_i z_k^m + h_i\left(1 - \sqrt{1 - \left(\frac{g_i z_k^m}{l_i}\right)^2}\right) \quad \text{[Expression 6]}$$

The correction value ($x_k^r$, $z_k^r$) exists in the area i among the areas of the Z range divided into N pieces. The correction parameters $l_i$, $h_i$, and $g_i$ are the arm length, the edge length, and the gain coefficient, respectively, in the area i.

(Nonlinear Least-Squares Method)

A nonlinear least-squares method suitable for estimation of correction parameters is explained below. In the present invention, using the nonlinear least-squares method for estimation of the correction parameters simultaneously provides a combination of correction parameters ($l_i$, $h_i$, $g_i$) (i=1, 2, . . . N) in which the evaluation amount $\varphi$ is minimized, the center coordinate ($x_c$, $z_c$) of the reference sphere, and the end radius r of the stylus. For the gain coefficient and the end radius r of a pivot stylus, which are conventionally calibrated using a step height standard and a pin gauge, calibration values are obtained by simply measuring the reference sphere in the present invention.

Initial value setting, which is important in the nonlinear least-squares method, is explained below. In order to appropriately estimate correction parameters in the nonlinear least-squares method, the setting of initial values for the correction parameters is very important and optimum initial values should be provided for the correction parameters. Providing inappropriate initial values for the correction parameters may result in a long convergence time and possibly a completely different solution. It is thus preferred to perform the nonlinear least-squares method using the initial values below as the initial values of the correction parameters. It is preferred, for example, to use design values as the initial values for the end radius r of each of the styluses 26A and 26B, the arm length $l_i$ (i=1, 2, . . . N) of the measurement arm 24, and the edge length $h_i$ (i=1, 2, . . . N) of each of the styluses 26A and 26B. It is preferred that the initial value of the Z-axis gain coefficient $g_i$ (i=1, 2, . . . N) be 1. It is preferred that the initial value of the center coordinate ($x_c$, $z_c$) of the reference sphere 100 be a value obtained from circle fitting by the least-squares method with the evaluation amount represented by the Expression 7 below.

$$\varphi = \sum_{k=1}^{n} \{(x_k^m - x_c)^2 + (z_k^m - z_c)^2 - r_c^2\}^2 \quad \text{[Expression 7]}$$

Specifically, the Expression 8 below is solved to obtain the initial value of the center coordinate ($x_c$, $z_c$).

$$\frac{\partial \varphi}{\partial x_C} = -4\sum_{k=1}^{n}\{(x_k^m - x_c)^2 + (z_k^m - z_c)^2 - r_c^2\}(x_k^m - x_c) = 0$$

$$\frac{\partial \varphi}{\partial z_C} = -4\sum_{k=1}^{n}\{(x_k^m - x_c)^2 + (z_k^m - z_c)^2 - r_c^2\}(z_k^m - z_c) = 0$$

$$\frac{\partial \varphi}{\partial r_C} = -4\sum_{k=1}^{n}\{(x_k^m - x_c)^2 + (z_k^m - z_c)^2 - r_c^2\}r_c = 0 \quad \text{[Expression 8]}$$

The Expression 8 above includes a relationship represented by the Expression 9. Thus, an equation to be solved is represented by the Expression 10.

$$r_c^2 = \frac{1}{n}\sum_{k=1}^{n}\{(x_k^m - x_c)^2 + (z_k^m - z_c)^2\} \quad \text{[Expression 9]}$$

$$2\left(\sum_{k=1}^{n} x_k^{m2} - n\bar{x}^2\right)x_c + 2\left(\sum_{k=1}^{n} x_k^m z_k^m - n\bar{x}\bar{z}\right)z_c = \sum_{k=1}^{n}(x_k^{m2} + z_k^{m2})(m_k^m - \bar{x})$$

$$2\left(\sum_{k=1}^{n} x_k^m z_k^m - n\bar{x}\bar{z}\right)x_c + 2\left(\sum_{k=1}^{n} z_k^{m2} - n\bar{z}^2\right)z_c = \sum_{k=1}^{n}(x_k^{m2} + z_k^{m2})(x_k^m - \bar{z}) \quad \text{[Expression 10]}$$

The Expression 10 above satisfies the Expression 11 below.

$$\bar{x} = \frac{1}{n}\sum_{k=1}^{n} x_k^m$$

$$\bar{z} = \frac{1}{n}\sum_{k=1}^{n} z_k^m \quad \text{[Expression 11]}$$

For efficient estimation of parameters in the nonlinear least-squares method, the Levenberg-Marquardt method below can be employed. In the case of employing the Levenberg-Marquardt method for calculation in the nonlinear least-squares method, a renewal vector $\Delta X$ of an unknown parameter is obtained by solving the Expression 12 below, where a Jacobian matrix is J and a damping factor is $\mu$ as the evaluation amount.

$$(J^T J + \mu I)\Delta X = -J^T f \quad \text{[Expression 12]}$$

In the expression above, I represents a unit matrix. Renewal of the unknown parameter may be finished at a point where a convergence condition is met, such as the renewal vector $\Delta X$ is sufficiently small or a change in the evaluation amount is sufficiently small. Specifically, in the Expression 13 below, each element of the Jacobian matrix is obtained by the Expression 14 below.

$$f_k = \sqrt{(x_k^r - x_c)^2 + (z_k^r - z_c)^2} - (R + r)$$ [Expression 13]
$$k = 1, 2, \ldots, n$$

$$\frac{\partial f_k}{\partial g_i} = p_x \frac{\partial x_k^r}{\partial g_i} + p_z \frac{\partial z_k^r}{\partial g_i}$$ [Expression 14]

$$\frac{\partial f_k}{\partial l_i} = p_x \frac{\partial x_k^r}{\partial l_i} + p_z \frac{\partial z_k^r}{\partial l_i}$$

$$\frac{\partial f_k}{\partial h_i} = p_x \frac{\partial x_k^r}{\partial h_i} + p_z \frac{\partial z_k^r}{\partial h_i}$$

$$\frac{\partial f_k}{\partial r} = -1$$

$$\frac{\partial f_k}{\partial x_c} = -p_x$$

$$\frac{\partial f_k}{\partial z_c} = -p_z$$

In the Expression 14 above, the Expression 15 below is applied.

$$p_x = \frac{(x_k^r - x_c)}{\sqrt{(x_k^r - x_c)^2 + (z_k^r - z_c)^2}}$$ [Expression 15]

$$p_z = \frac{(z_k^r - z_c)}{\sqrt{(x_k^r - x_c)^2 + (z_k^r - z_c)^2}}$$

The unknown parameter is obtained by sequential renewal in the Expression 16 until the convergence condition is met using the renewal vector $\Delta X^{(m)}$ obtained at the $m^{th}$ time in repeat calculation.

$$X^{(m)} = X^{(m-1)} + \Delta X^{(m)}$$ [Expression 16]

In the expression, $X^{(o)}$ represents the initial value of the unknown parameter.

In the configuration above, not only is an accurate mutual positional relationship between the upward stylus 26A and the downward stylus 26B provided, but also correction data to correct a measurement error associated with the vertical arc motion of the measurement arm 24 at the rotation axis 23 as a support point is obtained, the correction data including the arm length l of the measurement arm 24, the edge length h of each of the styluses 26A and 26B, the Z-axis gain coefficient g, and the end radius r of each of the styluses 26A and 26B. It is thus expected to provide high-precision measurement.

Modification

The present invention is not limited to the embodiments above. Modifications and improvements within a range achieving the features of the present invention may be included in the present invention. For example, the styluses 26A and 26B project orthogonal to the measurement arm 24 to upward and downward, respectively, in the embodiments above. The styluses 26A and 26B may be provided not orthogonal to the measurement arm 24. The styluses 26A and 26B, for instance, may be provided obliquely to the measurement arm 24 at any attachment angle, provided the styluses 26A and 26B project in the swing direction of the measurement arm 24.

The relative movement mechanism 40 is configured such that the stage 10 is movable in the Y-axis direction and such that the stylus displacement detector 20 is movable in the X-axis and Z-axis directions. The configuration is not limited to the above. As long as the stage 10 and the stylus displacement detector 20 are movable in the three-dimensional directions, either of the components may move.

The present invention can be used in measurement of internal and external surfaces of a cylinder, measurement of the thickness of a planar measured object, and the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A method of calibrating a surface texture measurement device, the device having:
    a detector having a measurement arm supported swingably in a vertical direction at a rotation axis as a support point, an upward stylus and a downward stylus each provided in an end portion of the measurement arm and projecting in a swing direction of the measurement arm, and a detection unit that detects a swing amount of the measurement arm;
    a stage holding a measured object; and
    a relative movement driver relatively moving the detector and the stage, the method comprising:
        obtaining first axis shape measurement data by:
            relatively moving the detector and the stage in a first axis direction while the downward stylus is in contact with an upper surface of a reference sphere to obtain first axis upper shape measurement data and;
            relatively moving the detector and the stage in the first axis direction while the upward stylus is in contact with a lower surface of the reference sphere to obtain first axis lower shape measurement data; and
        calculating offset amounts of the upward stylus and the downward stylus based on a first center coordinate obtained from the first axis upper shape measurement data and a second center coordinate obtained from the first axis lower shape measurement data.

2. The method of calibrating the surface texture measurement device according to claim 1, wherein said obtaining of the first axis shape measurement data comprises obtaining a maximum diameter by moving in a second axis direction orthogonal to the first axis direction to obtain a plurality of the first axis upper shape measurement data and a plurality of the first axis lower shape measurement data, to thus obtain an upper maximum diameter portion of the reference sphere from the plurality of obtained first axis upper shape measurement data, as well as to obtain a lower maximum diameter portion of the reference sphere from the plurality of obtained first axis lower shape measurement data.

3. The method of calibrating the surface texture measurement device according to claim 2 further comprising:
    obtaining second axis shape measurement data by:
        relatively moving the detector and the stage in the second axis direction orthogonal to the first axis direction while the downward stylus is in contact with the upper maximum diameter portion of the reference sphere to obtain second axis upper shape measurement data of the reference sphere; and relatively moving the detector and the stage in the second axis direction while the upward stylus is in contact with the lower maximum diameter portion of the reference sphere to obtain second axis lower shape measurement data, wherein said calculating of the offset amounts calculates the offset amounts of the upward stylus and the downward stylus based on the first center coordinate, the second center coordinate, a third center coordinate obtained from the second axis upper shape measurement data, and a fourth center coordinate obtained from the second axis lower shape measurement data.

4. The method of calibrating the surface texture measurement device according to claim 3, further comprising:

setting correction parameters to obtain correction parameters for correction of a measurement error included in the second axis upper shape measurement data and the second axis lower shape measurement data, wherein said setting of correction parameters simultaneously obtains correction parameters for each of a plurality of areas of a measurement range divided along the swing direction of the measurement arm.

5. The method of calibrating the surface texture measurement device according to claim 4, wherein the correction parameters comprise an arm length of the measurement arm, an edge length of each of the downward stylus and the upward stylus, and a gain coefficient.

\* \* \* \* \*